United States Patent
Asada

(10) Patent No.: US 8,310,082 B2
(45) Date of Patent: Nov. 13, 2012

(54) ELECTRICAL JUNCTION BOX AND POWER DISTRIBUTION UNIT

(75) Inventor: Kazuhiro Asada, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 518 days.

(21) Appl. No.: 12/585,035

(22) Filed: Sep. 1, 2009

(65) Prior Publication Data
US 2010/0112831 A1    May 6, 2010

(30) Foreign Application Priority Data
Nov. 5, 2008    (JP) .................. 2008-284552

(51) Int. Cl.
*B60L 1/00*    (2006.01)
*B60L 3/00*    (2006.01)

(52) U.S. Cl. ........................................................ 307/9.1
(58) Field of Classification Search .................. 307/9.1, 307/10.1; 361/62, 753, 622; 439/34, 76.2
See application file for complete search history.

(56) References Cited

U.S. PATENT DOCUMENTS
5,572,098 A * 11/1996 Dreon et al. .................. 318/293
2010/0231038 A1* 9/2010 Sugimura et al. ............. 307/9.1

FOREIGN PATENT DOCUMENTS
JP    A-2005-286128    10/2005
* cited by examiner

*Primary Examiner* — Carlos Amaya
(74) *Attorney, Agent, or Firm* — Oliff & Berridge, PLC

(57) ABSTRACT

An electrical junction box that includes a switching device such as a FET can prevent a ground potential on a circuit board from being indefinite and provides a power distribution unit utilizing the electrical junction box.

13 Claims, 6 Drawing Sheets

[Fig. 4]
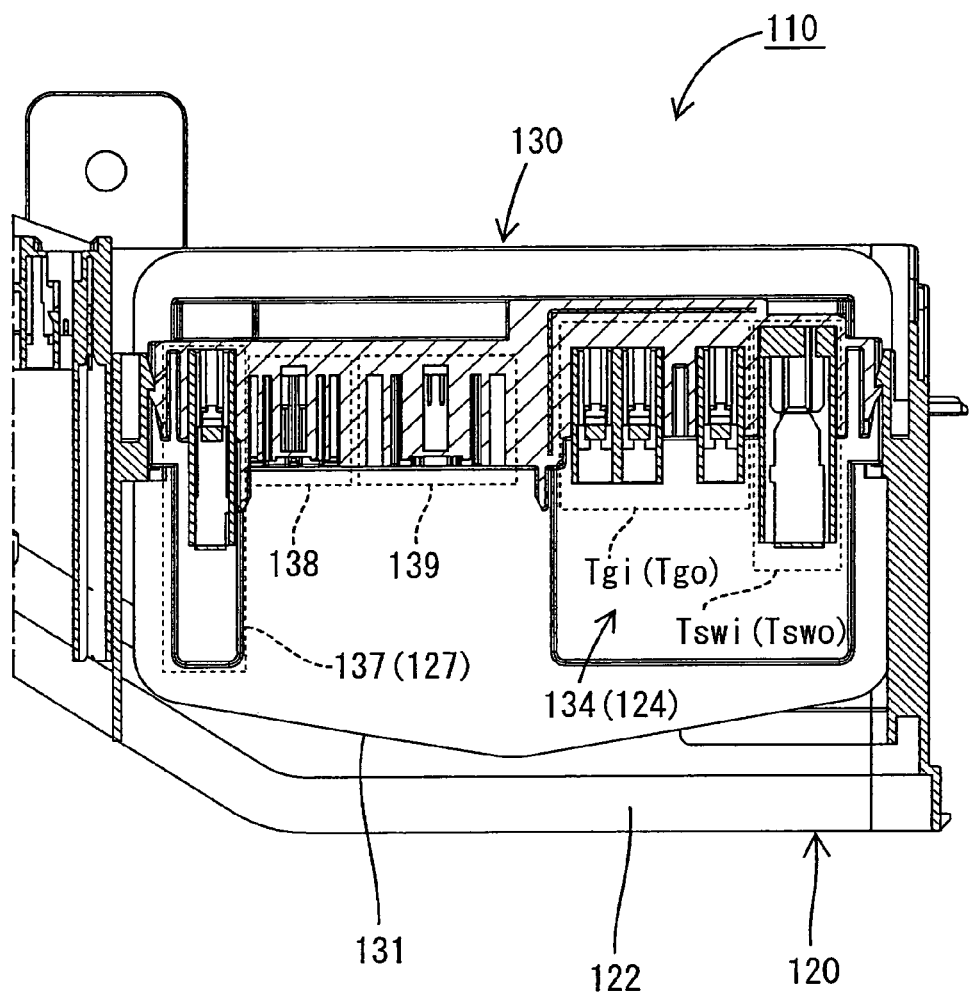

[Fig. 5]
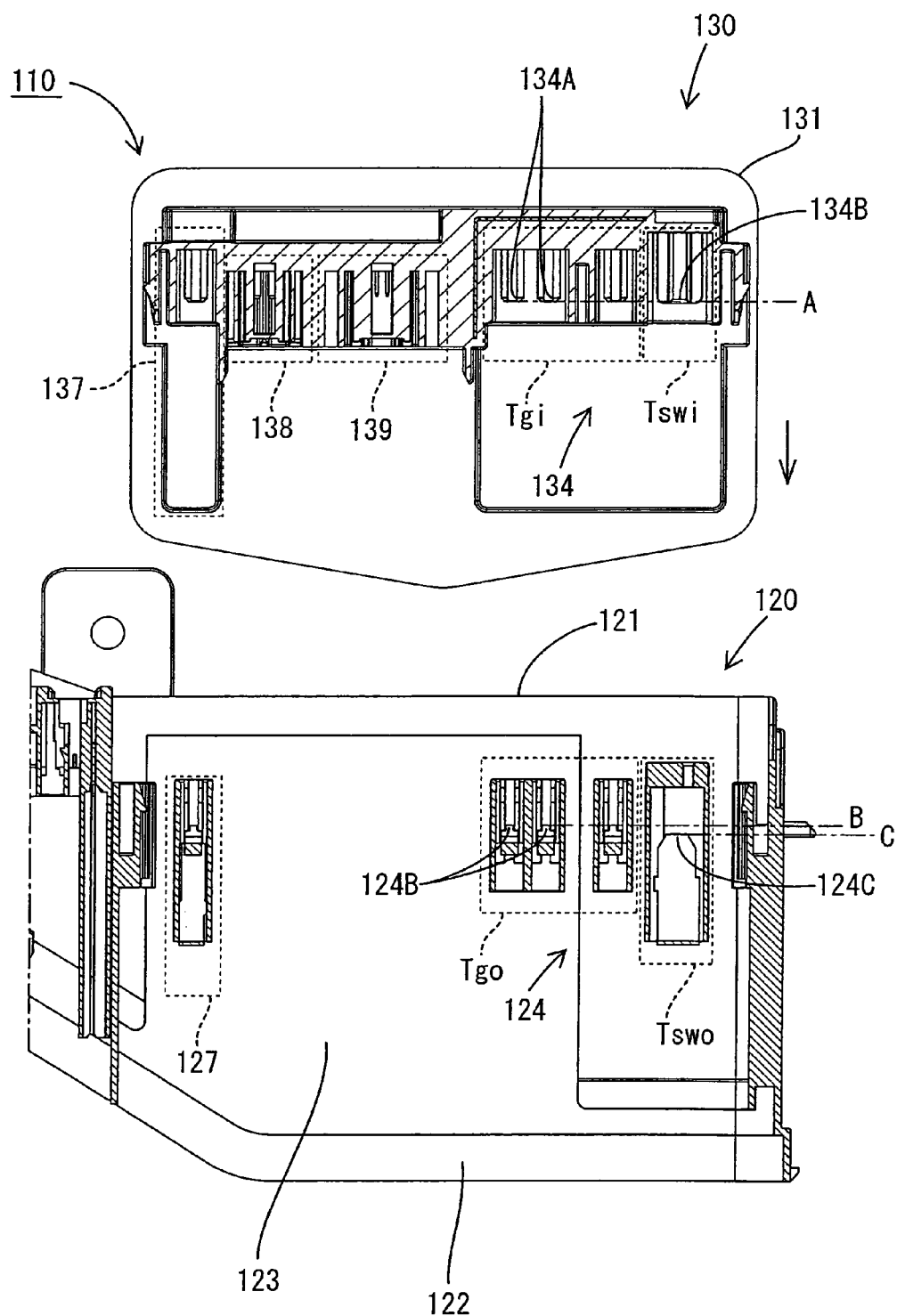

[Fig. 6]
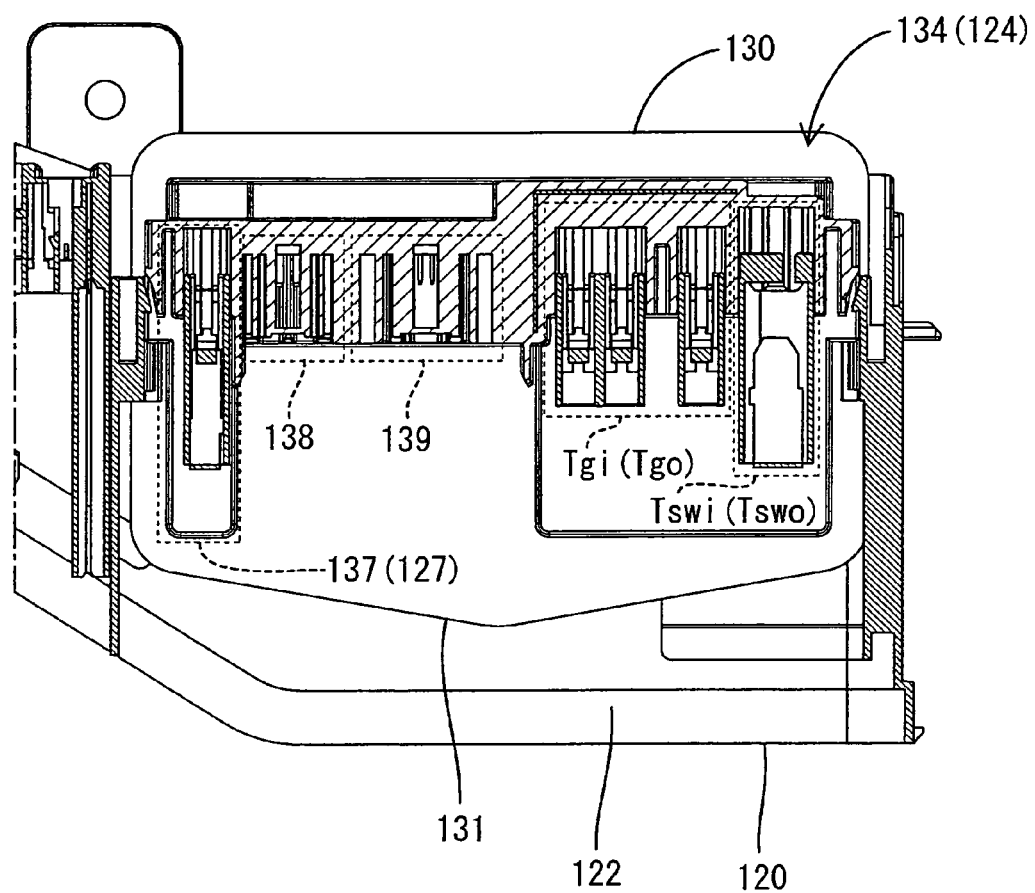

US 8,310,082 B2

ELECTRICAL JUNCTION BOX AND POWER DISTRIBUTION UNIT

BACKGROUND

This invention relates to an electrical junction box including a switching device such as a FET, and to a power distribution unit utilizing the electrical junction box.

In an electrical junction box for a vehicle, an electronic control has been developed recently. An ON-OFF control utilizing a semiconductor switching device such as a FET has been developed to control a conducting circuit to a load. This electrical junction box has been disclosed in, for example, JP 2005-286128 A1 Patent Document 1. This electrical junction box contains a mounted semiconductor switching device and a control circuit for the device on a circuit board contained in a housing. The electronic junction box performs an ON-OFF action for a load, input lines, ground lines from an electric power source line, a conducting line to a load, switches, and other embodiments, which are connected through a plurality of connectors provided in the housing.

SUMMARY

In an electronic junction box including a plurality of connectors, it is necessary to take into consideration the possibility that some connectors may not be connected to the electrical junction box during maintenance and repair of a vehicle. A conventional electrical junction box utilizing mechanical relays has no problem, even if the above-mentioned situation occurs. However, in a current electrical junction box utilizing a semiconductor switching device such as a FET, if one connector including a ground line is detached from the box while other connector including an electrical power source line are connected to the box, the ground line on a circuit board is separated from an external ground line, and the potential on the ground line will become indefinite. Consequently, operations of the FET and the control circuit will be unstable. In the worst case, there is a problem that a malfunction of a circuit or a breakage of a circuit device will occur if an ON signal is applied to the FET under the above-mentioned situation.

In the situation where the electric power source line and ground line are connected by a common connector, there is no assurance that a terminal for a ground line is detached from a terminal for an electric power source line simultaneously or early upon attaching and detaching the connector. There is the possibility that a ground potential on the circuit board will be indefinite even for a short time.

Furthermore, in the case where a terminal for a ground line causes a failure due to some reason, there is concern that the ground potential on the circuit board will be indefinite.

In view of the above-mentioned problems, an electrical junction box includes a switching device such as an FET that can prevent a ground potential on a circuit board from being indefinite and to provide a power distribution unit utilizing the electrical junction box.

BRIEF DESCRIPTION OF THE DRAWINGS

FIG. 4 is a sectional view of a second embodiment of the power distribution unit in accordance with the exemplary embodiments.

FIG. 5 is a sectional view of auxiliary and main electrical junction boxes, illustrating a state before the auxiliary electrical junction box is mounted on the main electrical junction box.

FIG. 6 is a sectional view of the auxiliary and main electrical junction boxes, illustrating a state when ground terminals in the boxes are coupled to one another.

DETAILED DESCRIPTION OF EMBODIMENTS

Figure 1:
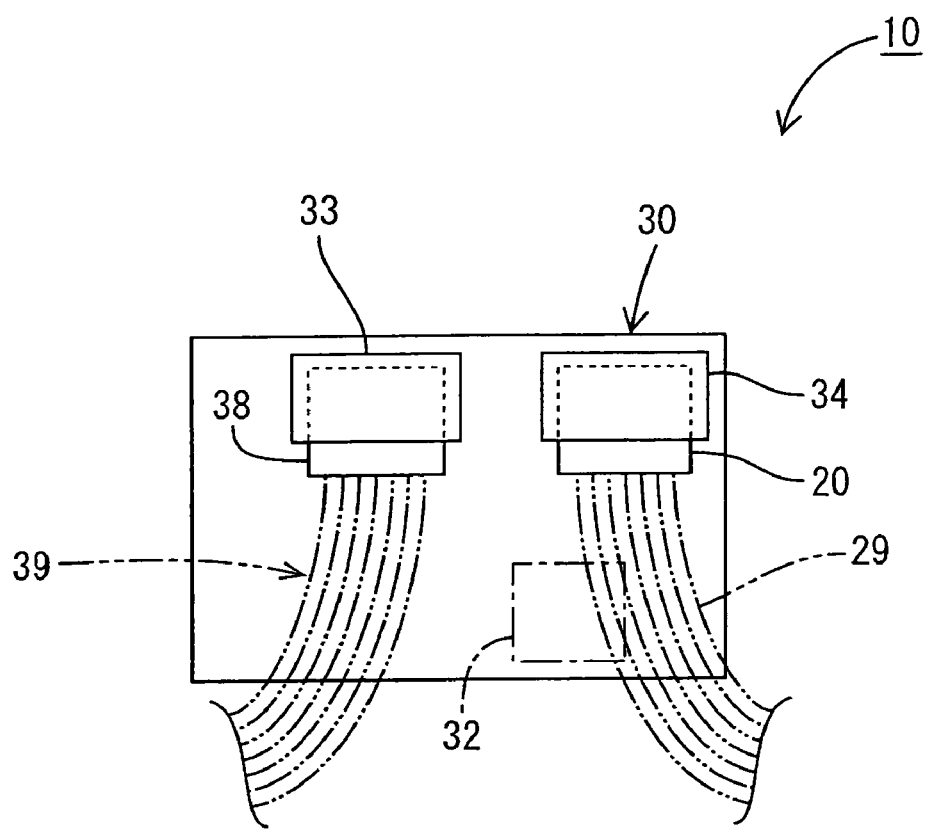
FIG. 1 is a schematic construction view of a first embodiment of a power distribution unit in accordance exemplary embodiments.

In an exemplary embodiment, an electrical junction box has an electrical power source side terminal adapted to be connected to an external electrical power source line; a semiconductor switching device connected to the electrical power source side terminal at an input side; an output terminal connected to an output side of the semiconductor switching device and adapted to be connected to an external load that receives electrical power from the electrical power source line; a driver circuit for controlling a switching operation of the semiconductor switching device; a ground terminal connected to a common line to be a ground potential for the driver circuit and adapted to be connected to an external ground line; a diode device connected in a forward direction from the ground terminal to the output terminal; and an input terminal for inputting to the driver circuit a potential that turns the semiconductor switching device to an ON action. The input terminal and ground terminal are provided in a first connector for external connection and the output terminal and electric power source side terminal are provided in a second connector for external connection that is different from the first connector, this orientation known as "first measure."

According to the first measure, in spite of the fact that when the connector for external connection is connected and an electric power that is supplied through the electrical power source side terminal in the connector to the electrical power source line and the connector including the internal ground terminal is not connected, the internal ground terminal is connected through the diode to an electrical power source side of an external load and the external load is connected to the ground line at the opposite side from the electric power source. Therefore, even if the internal ground terminal and the internal ground line is separated from the external ground line, it is possible to establish the ground potential higher than the original potential by the forward direction voltage of the diode. Since the forward direction voltage is generally about 0.6 to 0.7 V, a voltage approximately equal to the voltage of the electric power source is applied between the electrical power source line and the internal ground line, thereby preventing a malfunction of the circuit and a breakage of a device.

Also, since the output terminal and electric power source side terminal are provided in the common connector for external connection, when an electric power is supplied to the connector through the electrical power source side terminal from an external source, the connector is connected through the output terminal to the external load. At this time, as described above, the internal ground is established and it is possible to prevent a malfunction of the circuit or a breakage of a device.

Furthermore, since the input terminal and ground terminal are provided in the common connector for external connection, when the semiconductor switching device is turned to an ON state through the input terminal, the semiconductor switching device is also connected through the ground terminal to the ground line. Therefore, it is possible to prevent the malfunction of the circuit under this circumstance.

Also, a power distribution unit of the present invention comprises a main electric junction box that contains a plurality of switching devices that performs a switching operation of a conducting circuit to an external load, and an auxiliary electrical junction box adapted to be connected to the main electric junction box. The main and auxiliary electrical junction boxes are provided with standby connectors that electrically connect internal circuits of the boxes when the auxiliary electrical junction box is mounted on the main electrical junction box. The auxiliary electrical junction box comprises: an electric power source side terminal provided in the standby connector and adapted to be connected to an electric power source line of the main electrical junction box; a semiconductor switching device connected to the electric power source side terminal at an input side; an output terminal connected to an output side of the semiconductor switching device and adapted to be connected to an external load that receives electric power from the electric power source line; a driver circuit for controlling a switching operation of the semiconductor switching device; a ground terminal connected to a common line to be a ground potential of the driver circuit and provided in the standby connector to be connected to a ground line of the main electrical junction box; a diode device connected in a forward direction from the ground terminal to the output terminal; and an input terminal for inputting to the driver circuit a potential that turns the semiconductor switching device to an ON action. The output terminal and electric power source side terminal are provided in the standby connector or a connector for external connection. The input terminal and ground terminal are provided in a connector different than the connector provided for the output terminal and electric power source side terminal in the standby connector or the connector for external connection, (this configuration known as the "second measure."

According to the second measure, despite the fact that the standby connector or the connector for an external connection is connected and an electric power is supplied through the electric power source side terminal in the connector to the electric power source line, the connector including the ground terminal is not connected. In this case, the ground terminal is connected through the diode device to an electric power source side of an external load and the external load is connected to the ground line at the side opposite from the electric power source. After all, even if the internal ground terminal, in particular, the internal ground line is separated from the external ground line, it is possible to establish the potential higher than the original potential by the forward direction voltage of the diode. Since the forward direction voltage is generally about 0.6 to 0.7 V, a voltage approximately equal to the voltage of the electric power source is applied between the electric power source line and the internal ground line, thereby preventing a malfunction of the circuit and a breakage of the device.

Also, since the output terminal and electric power source side terminal are provided in a first connector different than the second connector provided for the input terminal and ground terminal when an electric power is supplied to the first connector through an electric power source side terminal from an external source, the first connector is connected through the output terminal to the external load. At this time, as described above, the internal ground is established and it is possible to prevent a malfunction of the circuit or a breakage of the device.

Furthermore, since the input terminal and ground terminal are provided in a common connector for external connection, when the semiconductor switching device is turned to an ON state through the input terminal, the semiconductor switching device is connected through the ground terminal to the ground line. Accordingly, it is possible to prevent the malfunction of the circuit.

The input terminal and ground terminal are in the standby connector, and the ground terminal and input terminal in the standby connector are disposed so that the ground terminals are contacted with each other before the input terminals are contacted with each other when the auxiliary electrical junction box is mounted on the main electrical junction box, this configuration known as the "third measure."

According to the third measure, since the ground terminals contact with each other before the input terminals contact with each other, the semiconductor switching device is turned to an ON state after the ground terminal is connected to the external ground, thereby preventing the malfunction of the circuit.

[Effects of the Invention]

Therefore, an electrical junction box including a switching device such as a FET or a power distribution unit utilizing the electrical junction box can prevent a ground potential on a circuit board from being indefinite.

Preferred Aspects of Embodying the Invention]

<First Embodiment>

Figure 2:
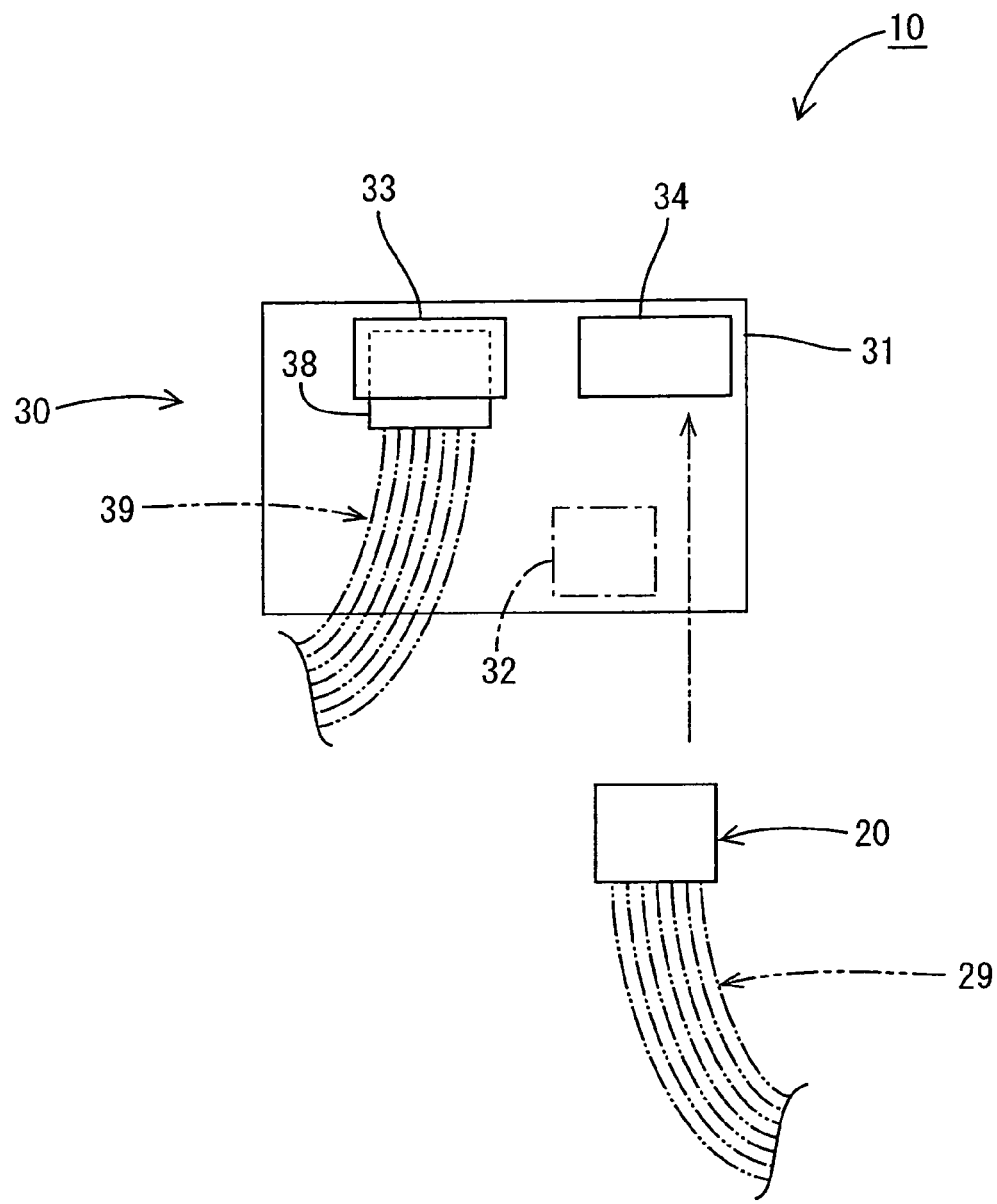
FIG. 2 is a schematic construction view of the power distribution unit, illustrating a state before a connector box is mounted on an auxiliary module.
Figure 3:
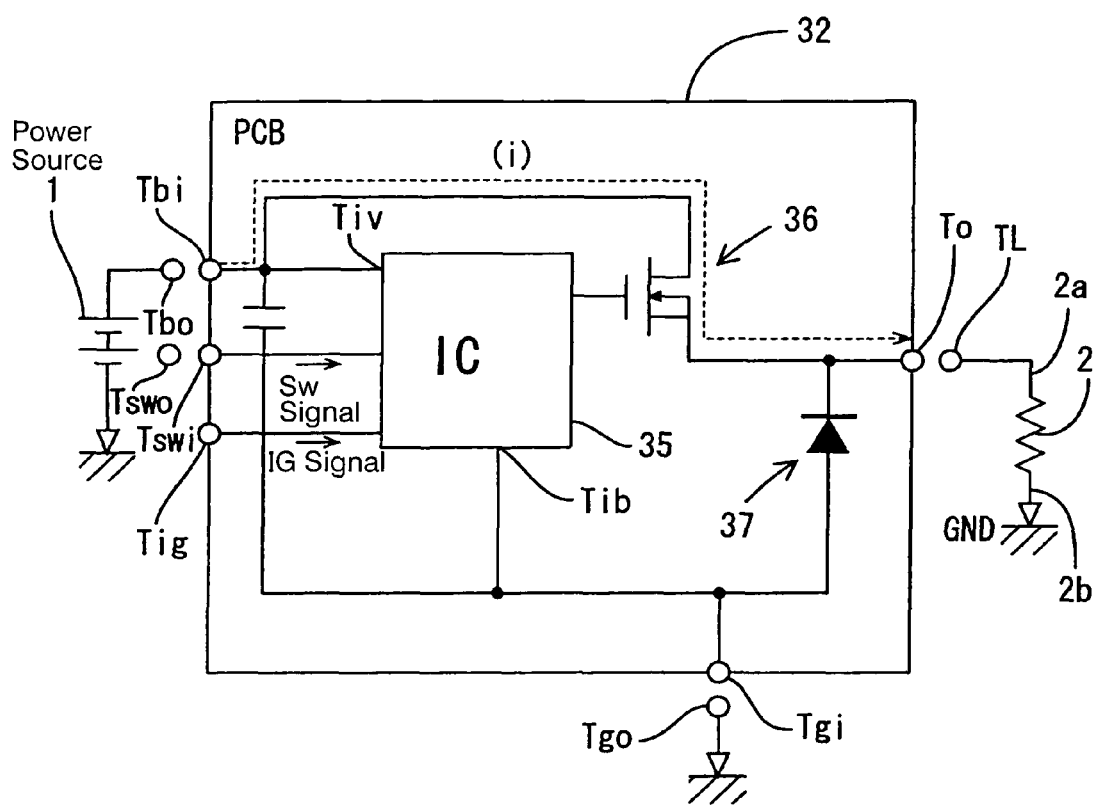
FIG. 3 is a diagrammatic view of a main construction of an auxiliary module circuit.

Referring now to FIGS. 1 to 3, a first embodiment of a power distribution unit 10 will be described below. The power distribution unit 10 is mounted on, for example, a vehicle (not shown).

The power distribution unit 10 includes a battery 1 (shown in only FIG. 3) as an electric power source. The power distribution unit 10 controls a supply of an electric power to an on-vehicle electric component 2 (shown in only FIG. 3) such as lamps, a horn, and defrosting heaters for rear glasses and side mirrors. A terminal 2b of the on-vehicle electrical component 2 opposite from the electrical power source is connected to an earth line of the vehicle.

As shown in FIG. 1, the power distribution unit 10 is formed into a flat rectangular parallelepiped configuration in which its size in thickness is smaller than its size in width. The power distribution unit 10 includes a female type connector box 20 and an auxiliary module 30 having a first connector section 34 in which the connector box 20 is fitted. The auxiliary module 30 corresponds to "an electrical junction box" of the present invention.

As shown in FIG. 2, the connector box 20 is formed into a rectangular parallelepiped configuration. The connector box 20 includes a female type ground terminal Tgo (FIG. 3) connected to the earth line (an external ground line) of the vehicle connected to a terminal of the battery 1, and a female type SW terminal Tswo connected to operating switches in a driver seat for controlling an ON-OFF action of the electrical component. A wire harness 29 connected to these terminals is led out from a rear side of the connector box 20.

The auxiliary module 30 is formed into a flat rectangular parallelepiped configuration in which its size in thickness is smaller than its size in width. A body casing 31 of the auxiliary module 30 contains a circuit board 32 that performs a switching action of the on-vehicle electrical component 2.

The body casing 31 is provided on one side, the facing side of the paper in FIG. 2, with a first connector section 34 and a second connector section 33.

The first connector section 34 is a male type connector and receives the female type connector box 20. The first connector section 34 includes the internal ground terminal Tgi and the SW terminal Tswi (input terminal) and is connected to the internal circuit board 32. When the first connector section 34 and connector box 20 are coupled to each other, their internal ground terminals Tgi and Tgo are connected to each other and their SW terminals Tswi and Tswo are connected to each other as well. The first connector section 34 may be provided with an IG terminal Tig (input terminal) for receiving a signal in response to an ON-OFF action such as an ignition key. In this case, the connector box 20 is provided with a corresponding external IG terminal.

The second connector section 33 is a male type connector and receives a female type connector 38 that connects to external connectors. The female connector 38 includes a load side terminal TL (FIG. 3) connected to an electric power source terminal 2a of the on-vehicle electric component 2 that is an external load, and an electric power source terminal Tbo connected to an electric power source line connected to an anode (+) terminal of the battery. The wire harness 39 including electrical wires connected to these terminals is led from a rear side of the female connector 38. On the other hand, the second connector section 33 includes an output terminal To to be connected to the load side terminal TL, and an electric power source terminal Tbi to be connected to the electric power source terminal Tbo.

As shown in FIG. 3, the circuit board 32 includes an integrated circuit ("IC") (drive circuit), an electric power source terminal Tbi to be connected to an electric power source line, N channel FET 36 a semiconductor switching device in which a drain electrode is connected to the electrical power source terminal Tbi, and an output terminal To to be connected to a source electrode of the N channel FET 36. A gate of the N channel FET 36 is connected to the IC 35 and is subject to an ON-OFF action in response to a signal from the IC 35.

Also, the output terminal To is connected through a diode 37 (a diode device) to the internal ground terminal Tgi. A direction of the diode 37 is set to be a forward direction heading from the internal ground terminal Tgi to the output terminal To.

The internal ground terminal Tgi is connected to a circuit (herein after referred to "an internal ground line") to be a reference potential in the auxiliary module 30 and is further connected to a reference potential input terminal (a ground terminal) Tib of the IC 35. The internal ground terminal Tgi is connected to the ground terminal Tgo of the connector box 20 when the connector box 20 is fitted in the first connector section 34, forming a connection to an external ground line (earth line of the vehicle).

The electric power source terminal Tbi is connected to the electric power source terminal Tiv of the IC 35. The electric power source terminal Tbi is connected to the electric power source terminal Tbo of the connector box 20 when the connector box 20 is fitted in the first connector 34, forming a connection to an external electrical power source line.

The SW terminal Tswi (the input terminal) is connected to the input terminal of the IC 35 to receive an SW signal in the IC 35 in response to an ON-OFF action of an external switch. The IG terminal Tig (the input terminal) is connected to the terminal of the IC 35 and receives a potential of an IG signal in the IC 35 in response to an ON-OFF action of the external ignition key. When the SW signal (or the IG signal, if required) reaches a given potential, the IC 35 turns the N channel FET 36 to an ON state.

The operation of the circuit will be described below.

Firstly, the female connector 38 that is the connector for external connection is fitted in the second connector section 33 of the auxiliary module 30. Consequently, the electric power source terminals Tbi and Tbo are interconnected and the output terminal To and the load side terminal TL are interconnected.

Secondly, the connector box 20 is fitted in the first connector section 34 of the auxiliary module 30. Consequently, their ground terminals Tgi and Tgo are interconnected and their SW terminals Tswi and Tswo are interconnected.

Since the reference potential input terminal Tib of the IC 35 is connected through the ground terminals Tgi and Tgo to the external ground line, a reference potential 0 volts is inputted into the reference potential input terminal Tib to establish the reference potential 0 volts in the IC 35.

A driver in a vehicle turns the ignition key to an ON position (at this time, the IG signal is applied to the IC 35, if required). When the operating switch in the driver seat is turned to an ON state, the SW signal is applied to the IC 35.

Since the IC 35 has already established the reference potential, the IC 35 operates normally. When the IC 35 detects both IG signal and SW signal, the IC 35 turns the gate of the N channel FET 36 to an ON state. Consequently, the electric power is supplied through the electric power source terminals Tbi and Tbo to the load from the external electric power source by the electric power source line, as denoted by path (i) in FIG. 3.

Since there is no assurance that the connector box 20, supplying the ground terminal Tgo, is fitted in the first connector section 34 at the same time or before the female connector 38, supplying the electric power source terminal Tbo, is fitted in the second connector section 33, there is a possibility that the ground potential of the circuit board becomes indefinite even for a short time. Also, there is a possibility that a failure in contact will occur between the ground terminals Tgi and Tgo or that the ground line in the auxiliary module 30 is separated from the ground line of the vehicle. Therefore, there is a concern that these events will cause a malfunction of the circuit or a breakage of a semiconductor device.

Regarding the problems in the above-mentioned embodiment, terminal 2b of the load 2 at the opposite side of the electrical power source is connected to the earth line of the vehicle intrinsically and the electric power source side terminal 2a of the load 2 is connected through the connector 38 to the output terminal To of the auxiliary module 30. Consequently, although the internal ground line in the auxiliary module 30 is not connected through the ground terminals Tgi and Tgo to the external ground line, a circuit to be connected to the external ground line is formed through the forward diode 37 and load 2.

Consequently, the potential of the internal ground line in the auxiliary module 30 establishes a value higher than the original value by a forward direction potential Vd (for example, 0.7 volts of the diode 37. Even if a current flows into the diode 37 and load 2 in series, since the current is feeble and a voltage drop in the load 2 is negligible, the potential on the internal ground line is substantially the same as the forward direction potential Vd in the diode 37.

As described above, according to the first embodiment, despite the fact that the female connector 38 for external connection is connected to the second connector section 33 and electric power is supplied through the electric power source side terminal Tbi in the second connector section 33 to the electric power source line, and the first connector section 34 including the internal ground terminal Tgi is not connected to the connector box 20, the internal ground terminal Tgi will be connected through diode 37 to an electrical power source side of an external load and the external load will be connected to the ground line at the side opposite from the electrical power source. Therefore, even if the internal ground terminal Tgi, in particular, the internal ground line is separated from the external ground line, it is possible to establish the potential higher than the original potential by the forward direction voltage of the diode 37. Since the forward direction voltage is generally about 0.6 to 0.7 V, a voltage approximately equal to the voltage of the electric power source is applied between the electric power source line and the internal ground line, thereby preventing a malfunction of the circuit.

Since the output terminal To and electric power source side terminal Tbi are provided in the common second connector section 33 for external connection, when an electric power is supplied to the second connector section 33 from an external supply, the second connector section 33 is connected through the electric power source side terminal Tbi to the external load. At this time, as described above, the internal ground is established, thereby preventing a malfunction of a circuit or a breakage of a device.

Furthermore, the common first connector section 34 for an external connection includes the SW terminal Tswi (an input terminal) for inputting to the IC 35 a potential that turns the N channel FET 36 to an ON state from the external supply, the IG terminal Tig (if required), and the internal ground terminal Tgi. Accordingly, in the case where the output terminal To is not connected to the load, and in the case where the internal ground is not established, since an ON signal is not inputted to the SW terminal Tswi, the N channel FET 36 is never switched ON. That is, since a condition is not ready for turning the N channel FET 36 to the ON state, it is possible to prevent the N channel FET 36 from causing a malfunction.

<Second Embodiment>

Next, referring now to FIGS. 4 to 6, a second embodiment of the power distribution unit 110 in accordance with the present invention will be described. The same signs in the first embodiment are given to the same elements in the second embodiment and explanations of the elements are omitted.

In the second embodiment, an auxiliary module 130 (an example of "an auxiliary electrical junction box" of the present invention) is mounted on a connector box 120 (an example of "a main electrical junction box" of the present invention). When the connector box 120 and auxiliary module 130 are coupled to each other, electric power source side terminals Tbi and Tbo and the ground terminals Tgi and Tgo of both box and module are connected to (contacted with) each other earlier than the other terminals that are connected one another.

As shown in FIG. 4, the power distribution unit 110 is formed into a flat rectangular parallelepiped configuration in which a size in thickness is smaller than a size in width. The power distribution unit 110 includes the connector box (the main electrical junction box) 120 having a plurality of relays and the like, and an auxiliary module (an auxiliary electrical junction box) fitted in the connector box 120. Circuits for switching the on-vehicle electrical component 2 are mounted on both connector box 120 and auxiliary module 130. The circuits are distributed on the basis of functions such as heat radiation (coefficient of heat radiation in the circuit). For example, a circuit in which a heat should be more radiated is contained in the connector box 120 while the other circuits are contained in the auxiliary module 130.

The connector box 130 includes a group of female type ground terminals Tgo (FIG. 3) connected to a vehicle earth line (external ground line) connected to one terminal of a battery 1, and a group of female type SW terminals Tswo connected to a group of operating switches in a driver seat for controlling an ON-OFF action of the electrical component. A wire harness (not shown) connects to these terminals and is led from a rear side of the connector box 120.

As shown in FIG. 5, a body casing 121 is formed into a flat rectangular parallelepiped configuration in which a size in thickness is smaller than a size in width. The body casing 121 includes an outer frame section 122 in which thicknesses of three sides are greater than that of one side. The outer frame section 122 is provided in an inner space with a fitting recess 123 adapted to receive the auxiliary module 130.

The fitting recess 123 is provided with a female connector section 124 adapted to receive a male connector section 134 of the auxiliary module 130.

The female connector section 124 includes a group of female ground terminals Tgo connected to a ground line, and a male type SW terminal Tswi into which an input signal is applied. The terminals Tgo and Tswi project upward from the female connector section 124.

The female ground terminals Tgo include a plurality of female ground terminals in which distal ends extend upward at the same heights.

Position B (FIG. 5) of a distal end of a contact portion 124B of each of the female ground terminals Tgo is set to be higher than position C (FIG. 5) of a distal end of a contact portion 124C of the male SW terminal Tswi.

The body casing 121 is provided on an end opposite from the female connector section 124 with a female ground terminal 127 connected to an internal circuit different from the circuit of the present invention.

An auxiliary module 130 is formed into a substantially flat rectangular parallelepiped configuration in which a size in thickness is smaller than a size in width. A circuit board (not shown) is contained in a body casing 131.

The body casing 131 is provided with a male connector section 134 (an example of "a standby connector" in the present invention) adapted to be fitted in the female connector section 124 of the connector box 120.

The male connector section 134 is disposed on a corner part on the body casing 131 (upper right corner in FIG. 5) and includes a group of male ground terminals Tgi to be inserted into the female ground terminals Tgo, and a male SW terminal Tswi to be inserted into the female terminal Tswo.

The male ground terminals Tgi include a plurality of male ground terminals in which distal ends extend upward at the same heights.

Positions A (FIG. 5) distal ends or contact portions, 134A and 134B of the male ground terminals Tgi, and male SW terminal Tswi are disposed at the same heights. However, since a position B (FIG. 5) of the distal end contact portion of each of the female SW terminals Tgo of the connector box 120 is higher than a position C (FIG. 5) of the distal end contact portion of the female SW terminal Tswo, the distance between the ground terminals of both connectors is shorter than the distance between the SW terminals. Thus, when coupling the connectors, the ground terminals are contacted with one another before the SW terminals are contacted with one another.

The male ground terminals Tgi and male terminal Tswi are connected to the internal circuit.

The male connector section 134 is provided on a side part with male connectors 138 and 139 having terminals connected to the internal circuits. A female connector for external connection (not shown) is adapted to be fitted in the female connector 138. The female connector includes a load side terminal TL connected to the electric power source side terminal 2a of the on-vehicle electrical component 2 that is an external load, and an electric power source terminal Tbo connected to the electric power source line coupled to an anode (+) terminal of the battery. The wire harness including the electric wires connected to these terminals is led from the rear side of the female connector 38. On the other hand, the male connector 138 includes an output terminal To connected to the load side terminal TL, and an electric power source terminal Tbi connected to the electrical power source terminal Tbo.

The male connector 138 is provided on a side part (left side in FIG. 5) with a male ground terminal 138 connected to a female ground terminal 127.

A connecting operation between the female ground terminals Tgo and female SW terminal Tswo in the female connector section 124 and the male ground terminals Tgi and male SW terminal Tswi in the male connector section 134 will be described below.

First, the female connector (not shown) having the load side terminal TL and electrical power source terminal Tbo is fitted into the male connector 138 for external connection in the auxiliary module 130. Thus, the electrical power source terminals Tbi and Tbo are connected to each other while the output terminal To and load side terminal TL are connected to each other.

Second, as shown in FIG. 5, the auxiliary module 130 is brought towards a fitting recess 123 in the connector box 120 downward in the inserting direction shown by an arrow.

Then, while the auxiliary module 130 is being inserted into the fitting recess 123, the male connector section 134 is fitted into the female connector section 124.

At this time, as shown in FIG. 6, the male ground terminals Tgi and female ground terminals Tgo in both connectors 124 and 134 are contacted with one another before the other terminals are contacted with one another. Consequently, the ground potential is inputted to the reference potential terminal Tib of the IC 35 connected through the internal circuit to the male ground terminals Tgi to establish the reference potential (ground potential) in the IC 35. Then, the female SW terminal Tswo and male SW terminal Tswi are contacted with each other to be electrically connected with each other. Consequently, it is possible to operate the IC 35 normally, since the IC 35 establishes the reference potential (ground potential).

In the second embodiment, the auxiliary module 130 (auxiliary electrical junction box) of the power distribution unit 110 includes the electric power source terminal (electric power source side terminal) Tbi provided in the male connector section (standby connector) 134 connected to the electric power source line of the connector box 120 (main electrical junction box), the N channel FET (semiconductor switching device) 36 connected to the electric power source terminal Tbi at the input side, the output terminal To connected to the output side of the FET 36 and to the external load that receives the electric power from the electric power source, the IC (driver circuit) 35 for controlling the switching operation of the N channel FET 36, the ground terminals (internal ground terminals) Tgi connected to the common line to be the ground potential in the IC 35 and provided in the male connector section 134 so as to be connected to the ground line in the connector box 120, the diode (diode device) 37 connected from the ground terminals Tgi to the output terminal To in the forward direction, and the male SW terminal (input terminal) Tswi for inputting to the IC 35 the potential that turns the N channel FET 36 to the ON action. The male SW terminal Tswi and ground terminals Tgi are provided in the common connector for external connection while the output terminal To and electrical power source side terminal Tbi are provided in the common connector for external connection.

Thus, since the auxiliary module 130 utilizes the same circuit 32 and connector sections as those in the first embodiment, the internal ground can be established in the auxiliary module 130, thereby preventing the reference potential (ground potential) in the circuit board from being indefinite, even if the electric power source side terminals are connected to one another before the ground terminals are connected to one another when coupling the connectors and the ground line of the circuit is separated from the ground line of the vehicle.

Since the output terminal To and electric power source side terminal Tbi are provided in a common connector section 138 (139) for external connection, when an electric power is supplied to the electric power source side terminal Tbi from an external supply, the electric power source side terminal Tbi is connected through the electric power source side terminal Tbi to the external load. At this time, as described above, the internal ground is established and it is possible to prevent a malfunction of a circuit or a breakage of a device.

Furthermore, the common male connector section 134 for external connection includes the male SW terminal (input terminal) Tswi for inputting to the IC 35 a potential that turns the N channel FET 36 to an ON state from the external supply, the IG terminal Tig (if required), and the internal ground terminal Tgi. Accordingly, in the case where the output terminal To is not connected to the load, that is, in the case where the internal ground is not established, since an ON signal is not inputted to the SW terminal Tswi, the N channel FET 36 is never actuated. That is, since a condition is not ready for turning the N channel FET 36 to the ON action, it is possible to prevent the N channel FET 36 from causing a malfunction.

The ground terminals Tgi and female SW terminal Tswi in the male connector section 134 are disposed so that the ground terminals are connected to one another before the SW terminals are connected to one another, in connection with mounting the auxiliary module 130 on the connector box 120.

According to the second embodiment, since the ground terminals Tgi and Tgo in both connector box 124 and male connector section 134 are electrically connected to one another before the SW terminals Tswi and Tswo in both box 124 and section 134 are electrically connected, it is possible to input a signal through the SW terminals Tswi and Tswo to the circuit, after the reference potential on the IC 35 becomes a ground potential to establish the ground potential on the circuit board, thereby turning on the circuit normally.

<Other Embodiments>

The present invention is not limited to the embodiments described above and illustrated in the drawings. For example, the following embodiment will fall into a technical scope of the present invention.

(1) A P channel FET may be utilized as a semiconductor switching device in lieu of the N channel FET 36.

What is claimed is:

1. An electrical junction box, comprising:
an electric power source side terminal;
a semiconductor switching device having an input side, an output side, and a gate, the semiconductor switching device being connected to the electric power source side terminal at the input side;
an output terminal connected to the output side of the semiconductor switching device;
a driver circuit connected to the gate of the semiconductor switching device;
a ground terminal connected to an internal ground of the driver circuit;
a diode device in a forward direction connected to the ground terminal and to the output terminal;

an input terminal connected to the driver circuit;
a first connector consisting of the input terminal and the ground terminal; and
a second connector consisting of the electric power source side terminal and the output terminal.

2. The electrical junction box of claim 1, wherein the driver circuit is an integrated circuit.

3. The electrical junction box of claim 1, wherein the semiconductor switching device is a N channel FET device.

4. The electrical junction box of claim 1, wherein the semiconductor switching device is a P channel FET device.

5. The electrical junction box of claim 1, the diode device in a forward direction is biased at 0.6 to 0.7 Volts.

6. The electrical junction box of claim 1, wherein the first connector is coupled to an ignition key and an earth line of a vehicle, and the second connector is coupled to a battery and a load device.

7. The electrical junction box of claim 6, wherein the load device is a lamp, a horn, defrosting heaters, or any combination thereof.

8. A power distribution unit, comprising:
a main electrical junction box having a first connector including an input terminal and a ground terminal;
a second connector including an output terminal and an electric power source terminal;
a diode device in a forward direction connected to the ground terminal and to the output terminal, wherein the ground terminal is coupled to an internal ground in the main electrical junction box;
an auxiliary electrical junction box having
a first connector including an input terminal and a ground terminal,
a second connector including an output terminal and an electric power source terminal,
a diode device in a forward direction connected to the ground terminal and to the output terminal, wherein the ground terminal is coupled to an internal ground in the auxiliary electrical junction box;
an aggregate first connector including the first connector of the main electrical junction box coupled to the first connector of the auxiliary electrical junction box; and
an aggregated second connector including the second connector of the main electrical junction box coupled to the second connector of the auxiliary electrical junction box.

9. The power distribution unit of claim 8, wherein the aggregate first connector is coupled to an ignition key and an earth line of a vehicle.

10. The power distribution unit of claim 8, wherein the aggregate second connector coupled to an anode of a battery and an external load.

11. The power distribution unit of claim 10, wherein the external load is a lamp, a horn, defrosting heaters, or any combination thereof.

12. The power distribution unit of claim 8, wherein the main electrical junction box is mounted on the auxiliary electrical junction box.

13. The power distribution unit of claim 8, wherein the aggregated first connector and the aggregated second connector each include a wire harness.

* * * * *